(12) United States Patent
Nakajima et al.

(10) Patent No.: US 8,010,232 B2
(45) Date of Patent: Aug. 30, 2011

(54) MOVABLE ROBOT

(75) Inventors: Yuichiro Nakajima, Toyota (JP); Haeyeon Lee, Toyota (KR); Hideki Nomura, Nagoya (JP)

(73) Assignee: Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 584 days.

(21) Appl. No.: 12/279,561

(22) PCT Filed: Feb. 15, 2007

(86) PCT No.: PCT/JP2007/052753
§ 371 (c)(1),
(2), (4) Date: Aug. 15, 2008

(87) PCT Pub. No.: WO2007/094420
PCT Pub. Date: Aug. 23, 2007

(65) Prior Publication Data
US 2010/0185327 A1 Jul. 22, 2010

(30) Foreign Application Priority Data
Feb. 17, 2006 (JP) ................. 2006-041323

(51) Int. Cl.
*G06T 1/00* (2006.01)
*B25J 19/00* (2006.01)
*B25J 19/04* (2006.01)
*B25J 5/00* (2006.01)
*G05B 15/00* (2006.01)

(52) U.S. Cl. ........ 700/259; 700/245; 700/250; 700/258; 901/47

(58) Field of Classification Search .......... 700/245–264; 901/47
See application file for complete search history.

(56) References Cited

U.S. PATENT DOCUMENTS
4,789,940 A * 12/1988 Christian .................. 700/113
(Continued)

FOREIGN PATENT DOCUMENTS
EP 0 163 737 12/1985
(Continued)

OTHER PUBLICATIONS
Notification of Reasons for Rejection for JP 2006-041323 dated Jan. 19, 2010.
(Continued)

*Primary Examiner* — Khoi Tran
*Assistant Examiner* — Dale Moyer
(74) *Attorney, Agent, or Firm* — Finnegan, Henderson, Farabow, Garrett & Dunner, LLP

(57) ABSTRACT

A technique to wholly recognize the surrounding environment may be provided by excluding unknown environment which arises due to parts of a body of a robot hindering the sight of the robot during operations.
The robot of the present invention is provided with a body trunk including head and torso, at least one connected member that is connected to the body trunk by a joint in which a driving mechanism is provided, a body trunk side camera that is arranged on the body trunk, and a connected member side camera that is arranged on the connected member. Further, the robot is provided with a composite image creation unit that creates composite image of a body trunk side image taken by the body trunk side camera and a connected member side image taken by the connected member side camera, such that a part of the body trunk side image is replaced with a part of the connected member side image so as to exclude the connected member from the body trunk side image.

7 Claims, 14 Drawing Sheets

U.S. PATENT DOCUMENTS

| | | | |
|---|---|---|---|
| 5,400,244 A | | 3/1995 | Watanabe et al. |
| 5,531,337 A | * | 7/1996 | Cappelletti et al. ............ 213/211 |
| 7,277,559 B2 | * | 10/2007 | Matsunaga et al. ............ 382/103 |
| 2004/0096083 A1 | | 5/2004 | Matsunaga et al. |
| 2005/0113974 A1 | | 5/2005 | Doi |
| 2005/0131581 A1 | | 6/2005 | Sabe et al. |
| 2005/0156562 A1 | * | 7/2005 | Cohen et al. ................... 320/107 |

FOREIGN PATENT DOCUMENTS

| | | |
|---|---|---|
| JP | 57-194895 | 11/1982 |
| JP | 3-60989 | 3/1991 |
| JP | 5-126521 | 5/1993 |
| JP | 2003-80488 | 3/2003 |
| JP | 2005-92820 | 4/2005 |

OTHER PUBLICATIONS

Extended European Search Report for EP Appl. No. 07714283.4 dated May 25, 2010.

European Search Report for European Patent Application EP10015276.8 dated Mar. 8, 2011.

European Search Report for European Patent Application EP10015275.0 dated Mar. 8, 2011.

Korean Office Action for Korean Patent Application 2008-7022581 dated Oct. 26, 2010.

* cited by examiner

MOVABLE ROBOT

CROSS REFERENCE TO RELATED APPLICATION

This application is a national phase application of International Application No. PCT/JP2007/052753, filed Feb. 15, 2007, and claims priority to Japanese Patent Application No. 2006-041323, filed on Feb. 17, 2006, the contents of both of which are hereby incorporated into this specification by reference.

TECHNICAL FIELD

The present invention relates to a robot that moves with self-driven power. Particularly, the present invention relates to a robot that moves by recognizing the surrounding environment using cameras.

BACKGROUND ART

Robots having a connected member that is connected to a body trunk via a joint that includes a driving mechanism are being developed. Among the robots of this type, there is a type of robot that creates an environmental map from environmental images that are taken by a body trunk-side camera arranged on the body trunk, and, based on the acquired environmental map, draws up a plan of its moving course to the aimed position. In the technique disclosed in the Japanese Patent Application Publication No. 2005-92820, images are taken by a camera that is arranged on a head of a robot, a disparity image or a distance image is calculated from the acquired image, planar parameters are computed from the acquired disparity image or distance image, and then creating an environmental map by abstracting a plurality of planes including the floorage space based on the acquired planar parameters. The robot recognizes the areas within which the robot is able to move from the environmental map, and plans its moving course based on the recognized areas.

DISCLOSURE OF INVENTION

With a robot having a connected member that is connected to a body trunk via a joint that includes a driving mechanism, there may be a case where part of the surrounding objects cannot be photographed by the robot's camera depending on the position of connected member such as an arm, leg or the like, because a part of the range of camera vision is interrupted by such connected member. Thus, there may be a case where an unrecognizable environment exists behind the connected member.

If such unrecognizable environment exists behind the connected member, the moving course of the body trunk may become difficult to plan. Moreover, the moving course of the connected member such as the arm or leg cannot be planned. Especially in planning a path to move the connected member to a target position, there may often be a case where an undesirable situation that the target position cannot be recognized due to the fact that the target position is located within the unrecognizable environment.

With the employment of the conventional technique, every time an unrecognizable environment arises, extra processes of moving the body trunk or the connected member to another position, then photograph the unrecognized environment, and re-determine the moving path after the unrecognized environment becomes "recognized" environment. The conventional technique, in addition to requiring aforesaid superfluous operations, cannot be effectively employed to robots which move their body trunks in a continuous motion. Furthermore, the conventional technique cannot be effectively employed by robots in an environment in which the surrounding objects are moving.

The present invention aims to realize a movable robot that may prevent the occurrence of unrecognizable environment.

The present invention provides camera on the connected member so that the area that are interrupted by the connected member from the view of the camera on the body trunk may be thereby photographed. Undesirable condition in which some parts of the environment cannot be photographed due to the existence of the connected member can thus be prevented.

The robot created by the present invention comprises a body trunk, a connected member that is connected to the body trunk by a joint in which a driving mechanism is provided, a body trunk side camera arranged on the body trunk, a connected member side camera arranged on the connected member and a composite image creation unit. The composite image creation unit creates a composite image of a body trunk side image taken by the body trunk side camera and a connected member side image taken by the connected member side camera, such that a part of the body trunk side image is replaced with a part of the connected member side image so as to exclude the connected member from the body trunk side image.

The aforesaid robot is able to achieve an environmental image with a wide range of view by utilizing the body trunk side image taken by the body trunk side camera. However, there may be a case where the connected member is included within the body trunk side image. In such a case, unrecognizable environment whose environment image cannot be achieved for being hidden by the connected member from the body trunk side camera may reside within the said body trunk side image.

Even in such a case, the aforesaid robot comprises the composite image creation unit that creates a composite image by composing the connected member side image into the body trunk side image. Hence, the area within the body trunk side image in which the connected member is photographed and remaining as an unrecognizable environment because of the connected member can be replaced with a corresponding image that is taken from the connected member side image. This results in no unrecognizable environment remaining within the created composite image.

The aforesaid robot may compute the moving course of its body trunk or connected member by utilizing the composite image having no unrecognizable environment. Superfluous operations which were conventionally required in order to get rid of the unrecognizable environment can thus be omitted. Furthermore, even in an environment in which the surrounding objects moves, appropriate moving path of the robot may be timely computed.

In another alternative embodiment of the robot of the present invention, the composite image creation unit may further comprise a first specifying unit that specifies the area in which the connected member is photographed within the body trunk side image, a second specifying unit that specifies corresponding area within the connected member side image that corresponds to the area of the body trunk side image specified by the first specifying unit, and a replacing unit that replaces the area of the body trunk side image specified by the first specifying unit with the corresponding area of the connected member side image.

As for the configuration of a member that specifies the area in which the connected member is photographed within the body trunk side image, the types of configuration may roughly be categorized into two types. One type of configuration may employ the positional relationship of the connected member with respect to the body trunk side camera (whose relationship is known to the robot) in the calculation of an image area in which the connected member is assumed to be photographed. Another type of configuration may extract a part of the body trunk side image that corresponds to the shape or contour of the connected portion (whose shape is known to the robot) by executing image processing on the body trunk side image, and then specify the area in which the connected member is photographed. Either configuration may be employed.

In the connected member side image, an area which would have been photographed by the body trunk side camera if the connected member had not been within the sight range of the body trunk side camera is photographed. The configuration that specifies such an area may also be categorized roughly into two types.

One type of configuration may employ the positional relationship of the connected member with respect to the body trunk side camera (whose relationship is known to the robot) and the positional relationship of the connected member side camera with respect to the connected member in the calculation of an image area which would have been photographed by the body trunk side camera had the connected member not been hindering the sight. Such configuration may be effective especially in the case where information of lateral distance in the depthwise direction is known to the robot. For example, in a case where a self-driven movable robot operates switches arranged on a wall, if the position of the robot with respect to the wall is known to the robot, then the scope of which to photograph the wall by the body trunk side camera may be calculated. Furthermore, if the position of the connected member with respect to the body trunk is known to the robot, then the scope of the wall of which cannot be photographed due to the existence of the connected member may be calculated. In a case where the position of the connected member with respect to the body trunk and the position of the connected member side camera with respect to the connected member are given, an area within the connected member side image that corresponds to the scope of the wall that cannot be photographed from the body trunk side camera for being located behind the connected member may be calculated. Furthermore, if the area in which the connected member is photographed within the body trunk side camera can be substituted with the area of the connected member side image that cannot be photographed from the body trunk side camera for being located behind the connected member, a composite image that is equivalent to an image taken by the body trunk side camera without having the connected member hinder the sight of the body trunk side camera may be acquired. In most cases, a composite image that equals to the body trunk side image which has been taken by the body trunk side camera cannot be achieved merely by replacing the area of the body trunk side image with the corresponding area of the connected member side image. This is due to the fact that difference exists in the position of the body trunk side camera and the connected member side camera. However, the connected member side camera is within the direction that cannot be photographed by the body trunk side camera, and the viewpoint of the body trunk side camera and the connected member side camera with respect to the area that cannot be photographed from the body trunk side camera does not generally differ. Rather, the body trunk side camera and the connected member side camera may take pictures from substantially the same direction. Thus, it is possible in some cases to achieve composite image which equals to an image that was photographed from the body trunk side camera without the connected member in sight, by simply changing the scale of the connected member side image and replacing a part of the body trunk side image with the corresponding part of the connected member side image of a reduced (increased in some cases) scale. Furthermore, in a case where needed, the connected member side camera image may be converted into an image that is supposed to have been taken by the body trunk side camera before being composed. The quality of the composite image can be improved. By utilizing such composite image, location of the switches existing within the area that cannot be photographed by the trunk side camera for being behind the connected member may thus be recognized. It may enable the connected member to move to the intended switch within such area. Consequently, the body trunk may be moved towards the intended switch.

Another type of configuration may specify an area from the connected member side image that corresponds to the area in which the connected member is photographed in the body trunk side image. With the execution of image processing on the body trunk side image, a part relevant to the contour of the connected member may be extracted from the body trunk side image. Such process may be enabled with a process of extracting feature points from the surrounding images existing thereby. For example, in a case where the connected member is positioned in front of a box and the view of the front plane of the box is partially hindered by the connected member, feature extraction may be processed on the body trunk side image to extract the figure that corresponds to the connected member, the feature points of the parts of the box that is not hidden by the connected member can be specified. By specifying feature points that surrounds the area in which the connected member is photographed, the area including the region in which the surrounding environment has not been able to be photographed because of the connected member may be determined. On the other hand, the aforesaid feature points that surrounds the area in which the connected member is photographed is also correspondingly recorded in the connected member side image. Thus, by extracting the aforesaid feature points from the connected member side image, an image of the surrounding environment within the region in which it has not been able to be photographed by the body trunk side camera because of the connected member may be determined within the connected member side image. Further by substituting the former area of the body trunk side image with the latter area of the connected member side image, a composite image that equals to an image taken by the body trunk side camera with the connected arm removed from sight may be obtained.

As explained above, depending on the environment in which the robot is operated, there may be a case in which the replacement area can be specified by calculation, while a case in which the replacement area can be specified by image processing may also exist. Note that the two processes described above are mere examples; the specifying process may not be limited only to the above described examples.

In another alternative embodiment of the robot of the present invention, the movable robot may further comprise a plurality of body trunk side cameras. In this case, the composite image creation unit may create composite image for each body trunk side image taken by the respective body trunk side camera. Under such a case, a plurality of composite images that are photographed from different views may be obtained. This may be useful in specifying the three-dimensional position of the feature point(s) that exist within the photographed scope in a case, for instance, where information regarding lateral or depthwise direction is unknown.

In another alternative embodiment of the robot of the present invention, the movable robot may calculate relative position(s) of one or more objects that exist in the surrounding of the movable robot by using the composite image. As in the aforementioned case in which the target of operation is arranged on a wall surface and the lateral or depthwise information thereof is given to the robot, the residing position of the operation target may be determined based on one composite image. Even in a case where the lateral or depthwise information is unknown to the robot, the three-dimensional residing position of the surrounding objects may be determined based on the plurality of composite images that shows the surrounding objects from different angles.

In another alternative embodiment of the robot of the present invention, the movable robot may further comprise a camera direction adjusting unit that is configured to adjust direction of the connected member side camera in accordance with the position of the connected member with respect to the body trunk side camera. The angle of the area in which the body trunk side camera cannot photograph with respect to the connected member may differ in accordance with the position of the connected member. With the configuration which adjusts the direction of which the connected member side camera faces in accordance with the position of the connected member, it may be guaranteed that the area in which the body trunk side camera cannot photograph is photographed by the connected member side camera. Occurrence of blind spot may be effectively prevented.

In a case where the lateral information is known, valid information may be obtained by simply creating one composite image. In a case to the contrary where the lateral information is unknown, obtainment of image information regarding a plurality of pictures which are taken from different views and calculation of the surrounding objects from the obtained image information may be usefully employed.

A movable robot that has been created to comply with that kind of demand may comprise a body trunk, a connected member that is connected to the body trunk by a joint in which a driving mechanism is provided, a plurality of body trunk side cameras that is arranged on the body trunk, a connected member side camera that is arranged on the connected member, a first calculating unit that calculates relative positional relationship of one or more objects existing within a photographed scope based on at least two body trunk side images taken by one or more of the plurality of body trunk side cameras and a second calculating unit that calculates relative positional relationship of one or more objects existing within a photographed scope based on a body trunk side image taken by at least one of the plurality of body trunk side cameras and a connected member side image taken by the connected member side camera. With the aforementioned configuration, the positional information is computed by processing image information that may be obtained from the images. A composite image does not necessarily have to be created.

In the aforementioned configuration, a plurality of body trunk side image information may be obtained by using the plurality of body trunk side cameras that are each arranged at different positions. Thereby, the relative positional relationship of the objects that are photographed in the plurality of body trunk side images may be calculated with respect to the movable robot. However, as of the surrounding objects that are not photographed for being behind the connected member in at least one of the body trunk side images used for the calculation, the position thereof cannot be determined.

With the configuration of the aforementioned movable robot, it uses a combination of a body trunk side image that is taken by one of the plurality of body trunk side cameras and a connected member side image that is taken by the connected member side camera. This combination of images also provides a plurality of image information that has been photographed from different views; the relative positional relationship of the surrounding objects with respect to the movable robot may be determined.

Even if the objects cannot be seen from all of the body trunk side cameras with the connected member obstructing the sights, so long as the objects are taken by one of the body trunk side camera, the image thereof may be used in combination with the information of the connected member side image in the specifying of the relative positional relationship of the said objects and the movable robot. According to the aforementioned configuration, the region remaining unknown to the robot may be lessened.

In another alternative embodiment of the robot of the present invention, the second calculating unit may select a body trunk side image in which portion of the connected member being photographed is the smallest to be used in the calculation of the relative positional relationship of the one or more objects with respect to the movable robot. With the configuration of this robot, in addition to the cases as illustrated in the unlimiting examples above, the calculation may be processed by employing the combinations of information regarding the connected member side image and respective information regarding each of the body trunk side images.

In accordance with the movable robot of the present invention, the camera arranged on the connected member endows a supplementary function of visual recognition to the connected member. The aforementioned configuration contributes in decreasing or exterminating the unknown regions which cannot be photographed by the body trunk side camera. With the aforementioned configuration, the movable robot may promptly and safely be operated.

EMBODIMENTS OF THE INVENTION

Some of the preferred features of embodiments in which the present invention may be carried out will be listed below.

(Mode 1) The robot may comprise a moving mechanism arranged on the body trunk. The embodiments disclosed in the present specification employs wheels, but the moving mechanism may be legged links.

(Mode 2) The robot may calculate the course of moving passage of the body trunk based on an environment map.

(Mode 3) The robot may calculate the moving route of the connected member based on an environment map.

(Mode 4) The robot may calculate the moving route of the body trunk and the connected member based on an environment map.

(Mode 5) The robot may control the attitude of the robot and the photographing direction of respective cameras by employing joint angle controller, wheel revolution controller, positional information detection device and the like. A body trunk side camera direction calculating unit may calculate the photographing direction of the body trunk side camera, and a connected member side camera direction calculating unit may calculate the photographing direction of the connected member side camera (Mode 6) The robot may create the moving route based on the information earned from the composite image. The joint angle controller, wheel revolution controller, positional information detection device controls actuator(s) to move the body trunk and/or the connected member in accordance with the created moving route.

(Mode 7) The robot may comprise a route correction unit that makes correction in accordance with the changes that occur in the surrounding environment to the moving route (course) that it previously had made.

First Embodiment

Figure 1:
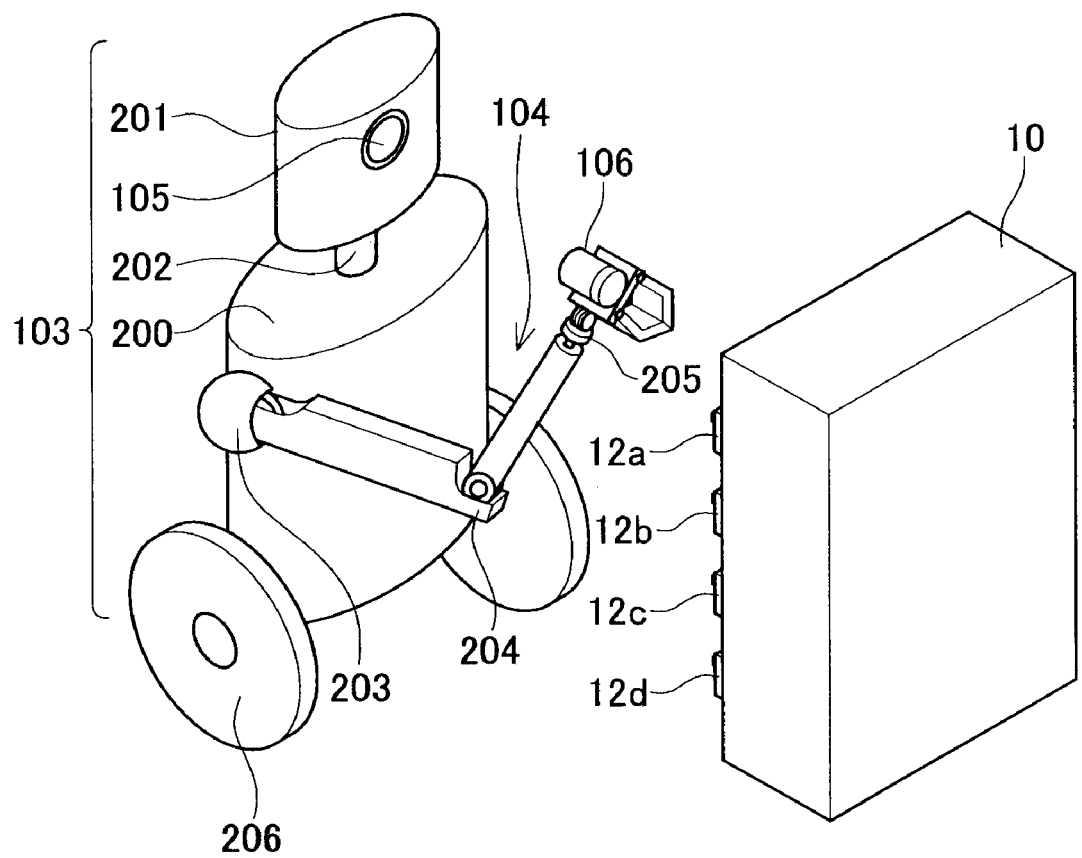
FIG. 1 shows a perspective view of a robot of the first embodiment and its surrounding environment.

An unlimiting first embodiment of the present invention will be described below with reference to the drawings. FIG. 1 shows a perspective view of a robot 100 of this embodiment and its surrounding environment. The robot 100 is provided with a body trunk 103, a connected member (hereinafter referred to as "arm") 104 connected to the body trunk 103 by a shoulder joint 203. A plurality of arms 104 may be provided. The body trunk 103 includes a torso 200, a neck joint 202 and head 201. A body trunk side camera 105 is fixedly arranged on the head 201. The body trunk side camera 105 changes its photographing direction (hereinafter may also be referred to simply as "direction" or "camera direction") with respect to the torso 200 by the rotation of the neck joint 202. A pair of coaxial wheels 206 is arranged on the lower side of the body 200. The robot 100 moves the body trunk 103 by using the wheels 206.

The arm 104 includes a shoulder joint 203, elbow joint 204, and wrist joint 205. An arm side camera 106 is arranged on the hand part. The shoulder joint 203, elbow joint 204, and wrist joint 205 are each installed with a driving mechanism. Thus, the arm side camera 106 may change its direction (photographing direction) with respect to the body 200 by the driving force of the shoulder joint 203, elbow joint 204, and wrist joint 205. Furthermore, the position of the arm side camera 106 with respect to the torso 200 may also be changed by the works of those joints.

The robot 100 is further provided with a device that measures the position of the head 201 within the working environment of the robot 100 so that the camera position and the direction of the body trunk side camera 105 are recognized. Moreover, with a relevant configuration, the camera position and the direction of the arm side camera 106 with respect to the body trunk 103 is also recognized.

The robot 100 of the present embodiment approaches the switching panel 10 by using the wheels 206, and operates the group of switches 12a, 12b, etc. by using the arm 104. In this embodiment, the position of the wall where the switching panel 10 is arranged is given to the robot 100.

Figure 2:
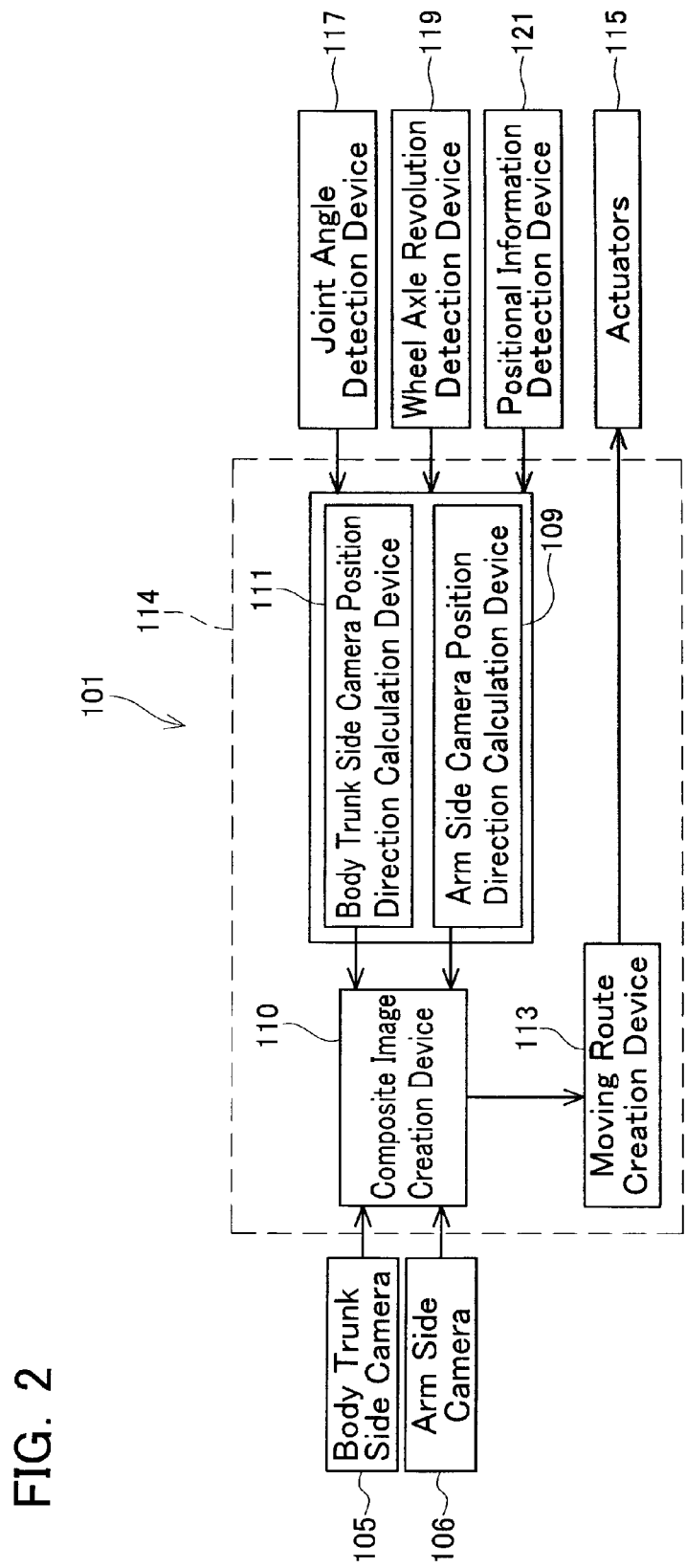
FIG. 2 shows a schematic mechanism of the robot of the first embodiment.

FIG. 2 shows a schematic mechanism 101 of the robot 100. The mechanism 101 is used in the robot's visual recognition of the surroundings. The robot 110 of the present embodiment is provided with a controller 114. The controller 114 includes a composite image creation device 110, a moving route creation device 113, a body trunk side camera position/direction calculation device 111, and an arm side camera position/direction calculation device 109. The composite image creation device 110 is configured to have a body trunk side image information input from the body trunk side camera 105, an arm side image information input from the arm side camera 106, a position and direction of the body trunk side camera 105 input from the body trunk side camera position/direction calculation device 111, and a position and direction of the arm side camera 106 input from the arm side camera position/direction calculation device 109. Based on the aforementioned inputs, the composite image creation device 110 creates a composite image from the body trunk side image info and the arm side image info. The moving route creation device 113 creates the further moving route based on the created composite image, and in accordance with the created moving route, controls the actuators 115 that are provided to drive the wheels 26 and the joints. Thus, the moving route creation device 113 controls the actuators 115 such that the wheels 26, the head 201 and arm 104 respectively in accordance with the created route. The robot 100 is further provided with a wheel axle revolution detection device 119 that detects the frequency of revolution of the wheels 26, a joint angle detection device 117 that detects the joint angle of each of the joints, and a positional information detection device 121 that is arranged in the torso 200 and detects the position of the torso 200. The information that are retrieved by the aforesaid devices are inputted into the body trunk side camera position/direction calculation device 111 and the arm side camera position/direction calculation device 109.

Since the robot comprises the moving route creation device 113 that creates the course to move by recognizing the surrounding environment from image information driven from cameras whose positions and photographing directions are known, the camera position and the camera directions may be calculated again after moving along the determined route, which may be followed by the process of taking pictures may be carried out again. The aforesaid series of processes may be repeated, which enables the robot to move autonomously.

Figure 3:
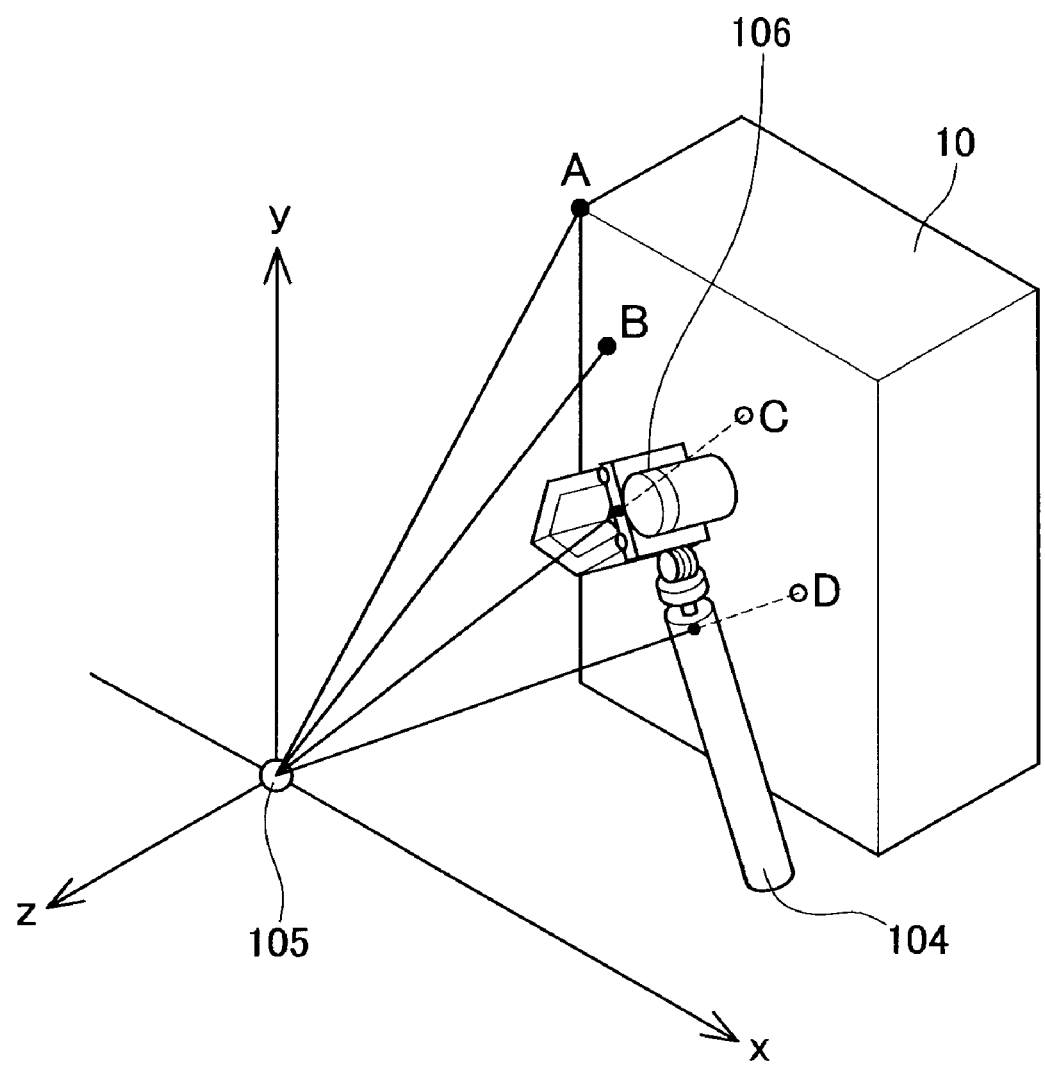
FIG. 3 shows a view of the robot of the first embodiment.

FIG. 3 shows a view of the robot 100. In a case where the arm 104 of the robot 100 comes into the sight of the body trunk side camera 105, environmental information regarding the environment behind the arm 104 cannot be obtained. Specifically, in the body trunk side image that is taken by the body trunk side camera 105, while the points A and B of the switching panel 10 of FIG. 3 will be photographed, the points C and D will not be photographed. Thus, information of the surrounding object in regards to the points C and D remains unknown, thus has conventionally been causing problems as to the robot not being able to sufficiently recognize the environmental circumstance nor to understand the relative positional relationship of the surrounding objects with respect to the robot 100. In contrast, the visible range is enlarged by the application of the arm side camera 106 with the technique of the present embodiment; the present technique enables the robot to recognize the unknown area including the points C and D.

Figure 4:
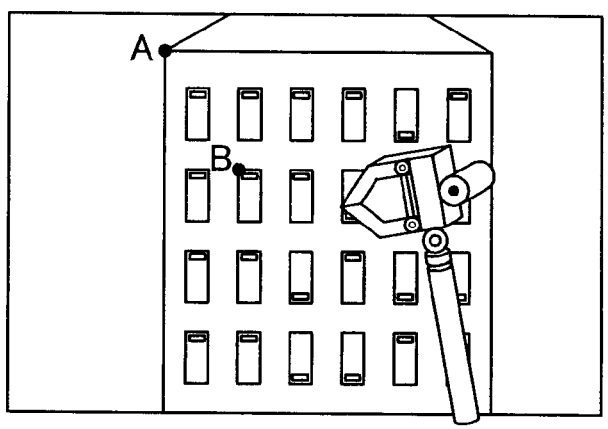
FIG. 4 shows an example of a body trunk side image.
Figure 5:
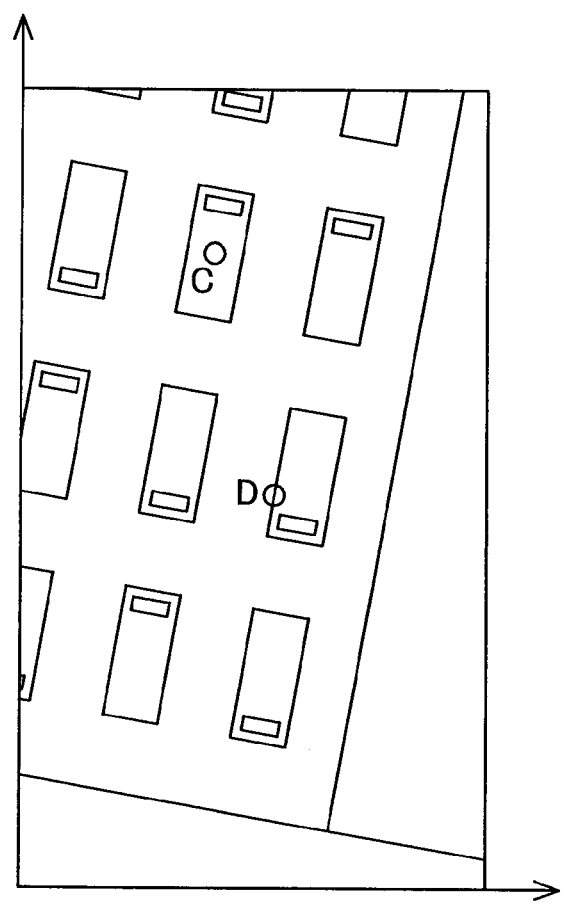
FIG. 5 shows an example of a connected member side image.

FIGS. 4 and 5 respectively shows an example of the body trunk side image and the arm side image. Though the panel is partially hidden by the arm 104 in the body trunk side image of FIG. 4, the corresponding surface of the panel is recorded in the arm side image of FIG. 5. Such relationship of the body trunk side image and the arm side image is established with the position of the head 201 and the arm 104 being controlled with the detection of the joint angle detection device 117, and the camera direction of the arm side camera 106 being adjusted in accordance with the relative position of the body trunk side camera 105 and the arm 104. The camera direction of the arm side camera 106 is adjusted such that the arm side camera 106 photographs in the direction in which the area that is hidden from the body trunk side camera by the arm 104 may be photographed.

Information regarding magnification of the camera, image size and the like of the respective cameras are obtained by either the body trunk side camera position/direction calculation device 111 and the arm side camera position/direction calculation device 109. Furthermore, since image processing based on the aforesaid information will be carried out at the time of composing the images to create a new image, the photographed scope of each image does not have to be of a complete match. For example, The distance between the switching panel 10 and the body trunk side camera 105 may differ from that of the switching panel 10 and the arm side camera 106, and the arm 104 may be tilted with respect to the angle of the head 201. Due to the aforementioned reasons, the arm side image of FIG. 5 depicts the switching panel 10 in an enlarged magnitude and also angled with respect to the body trunk side image of FIG. 4.

Figure 6:
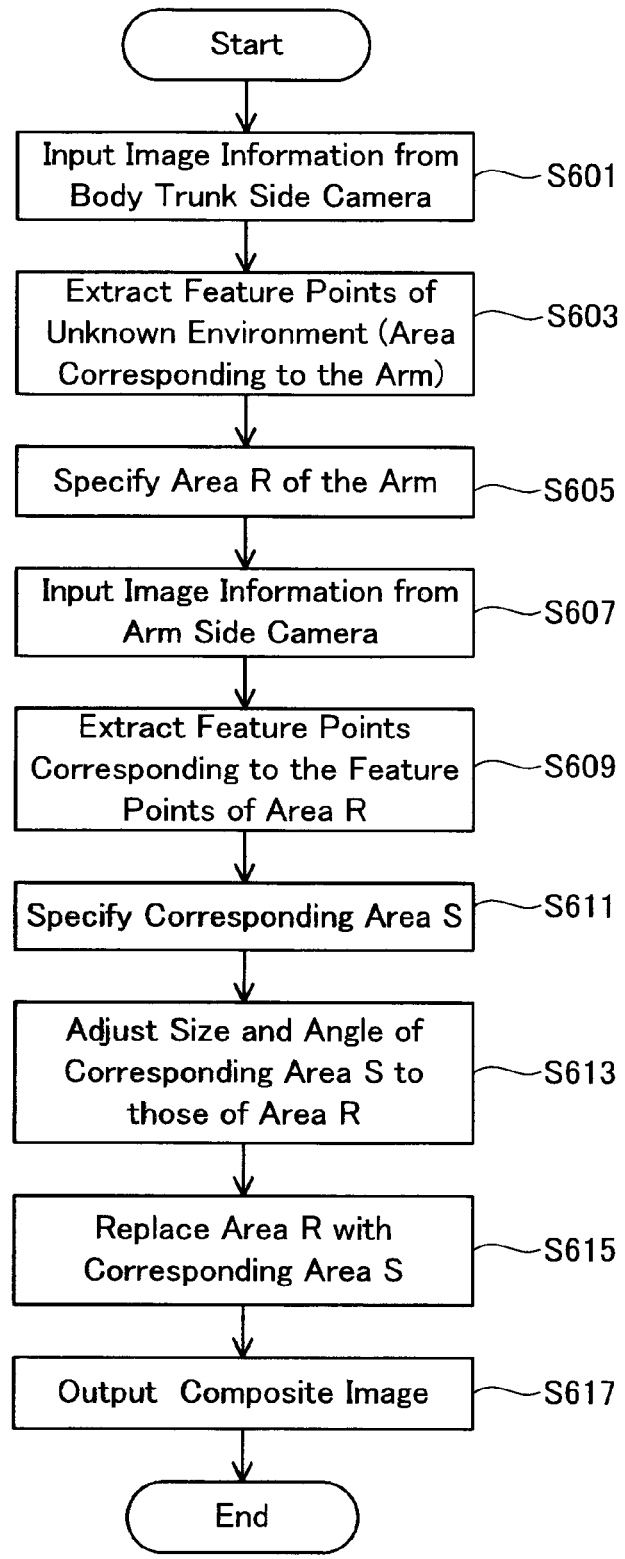
FIG. 6 is a flowchart showing a process to be executed by an image-composition processing device.

FIG. 6 shows a flowchart of the image composite process. In the explanation below, it is assumed that the robot 100 and the switching panel 10 are in a positional relationship as shown in FIG. 1 at the time of starting the below process. Simultaneously, the arm 104 of the robot 100 is at a position as shown in FIG. 4, and such image as in FIG. 4 is photographed by the body trunk side camera 105. In the below-assumed situation, the robot 100 is trying to move the arm 104 in order to operate switch 12c (see FIG. 1), however, the target switch 12c is within the unrecognizable area within the body trunk side image for being behind the arm 104. The process of FIG. 6 may be commenced under such a condition.

Figure 7:
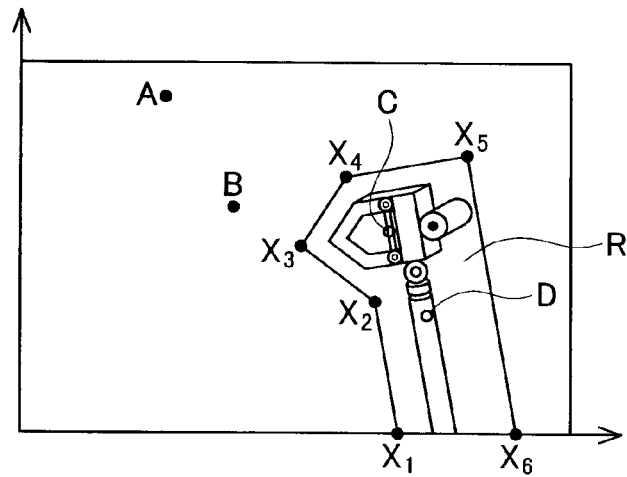
FIG. 7 shows area R in which a connected member is photographed within the body trunk side image of FIG. 4.

In step S601, information regarding the body trunk side image is input into the composite image creation device 110. In step S603, feature points $X_n$ of the unknown environment that is unknown within the body trunk side image are extracted. FIG. 7 shows an example of the extracted feature points. Since the contour of the arm 104 is known to the robot 100, the area in which the arm 104 is photographed (which is a photographed scope of the arm) can be specified from the body trunk side image. This equals to the employment of a first specifying unit. The points $X_1$-$X_6$ of the figure are feature points that were extracted to surround the photographed scope of the arm. In the present embodiment, six individual feature points that can be linearly connected are extracted. However, the feature points $X_n$ may be extracted in any form so long as they are aligned along or in accordance with the contour of the arm. In step S605, the area R in which the arm 104 is photographed (that is, the area whose surrounding object information is unknown) is specified from the feature points that have been extracted in step S603. The area of FIG. 7 that is bordered by the feature points $X_1$-$X_6$ is the area R. The area R of the present embodiment roughly resembles the outline of the arm 104. The area R that is bordered by the feature points may closely resemble the outline of the arm in a more genuine manner by increasing the number of feature points $X_n$ to be extracted.

Figure 8:
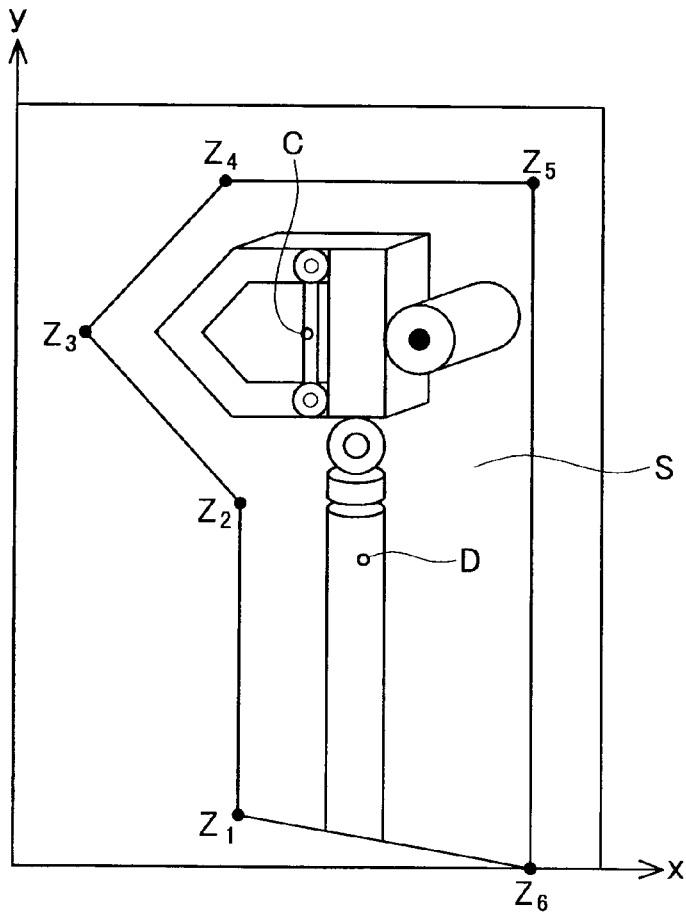
FIG. 8 shows corresponding area S within the connected member side image of FIG. 5.

In step S607, information regarding the arm side image is input into the composite image creation device 110. In step S609, feature points $Z_n$ that corresponds to the feature points that defines the area R of the body trunk side image are extracted. FIG. 8 shows an example of the extracted feature points. The feature points $Z_1$-$Z_6$ of FIG. 8 are the feature points that correspond to the feature points $X_1$-$X_6$ extracted of the body trunk side image. In step S611, the corresponding area S (an area that corresponds to the unknown area of the body trunk side image) is specified from the feature points that have been extracted in step S609.

In step S613, adjustment of size, rotation of angle and the like is processed, based on the difference information of the input images from the body trunk side camera and the arm side camera, on the corresponding area S that is obtained from the arm side image. The adjustment process is carried out so that the corresponding area S can appropriately be applied to the area R that depicts the arm within the body trunk side image.

Figure 9:
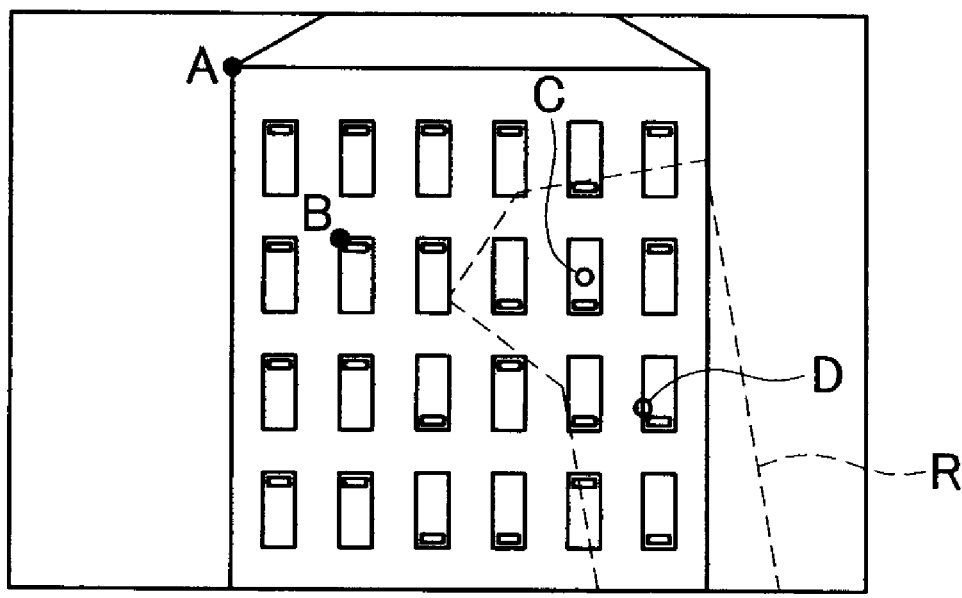
FIG. 9 shows an example of output of step S613.

In step S615, the area R of the body trunk side image is replaced with the corresponding area S, of which had gone through the aforementioned process to prepare for the image composition. As the result of the replacement process, a composite image which unknown area has been excluded from view is outputted in step S617. FIG. 9 shows an example of such composite image. The image within the area R shown with broken like has been substituted with the image of area S. Thereby, a composite image in which the arm is not included can be obtained.

The robot of the present embodiment may be provided with a plurality of body trunk side cameras. In such a case, the area $R_x$ that depicts the arm within each of the body trunk side image may be extracted from respective body trunk side image, and corresponding areas $S_x$ may be extracted from the arm side image to correspond with each of the extracted area $R_x$, and replace each of the areas $R_x$ with the respective corresponding area $S_x$.

Figure 10A:
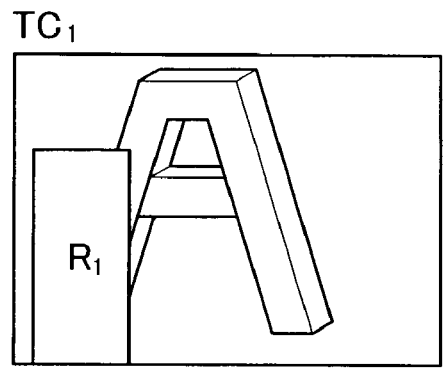
FIG. 10A shows a body trunk side image taken by a body trunk side camera arranged on the right side of the robot.
Figure 10B:
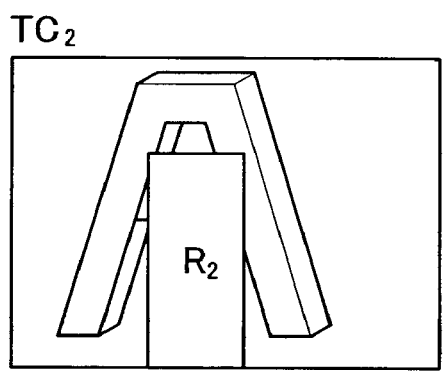
FIG. 10B shows a body trunk side image taken by a body trunk side camera arranged at the center of the robot.
Figure 10C:
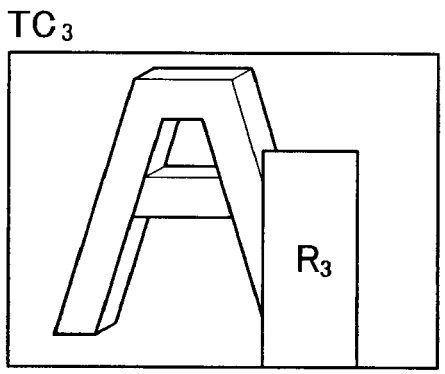
FIG. 10C shows a body trunk side image taken by a body trunk side camera arranged on the left side of the robot.

FIG. 10 shows examples of areas R of the body trunk side images. In a case where the robot is arranged with three body trunk side cameras; one on left and right side each and another at the center of the body trunk 103, a body trunk side image $TC_1$ as shown in FIG. 10A may be obtained by the body trunk side camera on the right side, a body trunk side image $TC_2$ as shown in FIG. 10B may be obtained by the body trunk side camera at the center position, and a body trunk side image $TC_3$ as shown in FIG. 10C may be obtained by the body trunk side camera on the left side. The body trunk side images $TC_1$, $TC_2$, $TC_3$ go through the process of steps S601 to S605, and area $R_1$, $R_2$, $R_3$ have been specified in each images respectively. Due to the difference in the position of which each of the body trunk side cameras are arranged, the position of which the arm is photographed differs in the body trunk side images $TC_1$, $TC_2$, $TC_3$.

Figure 11:
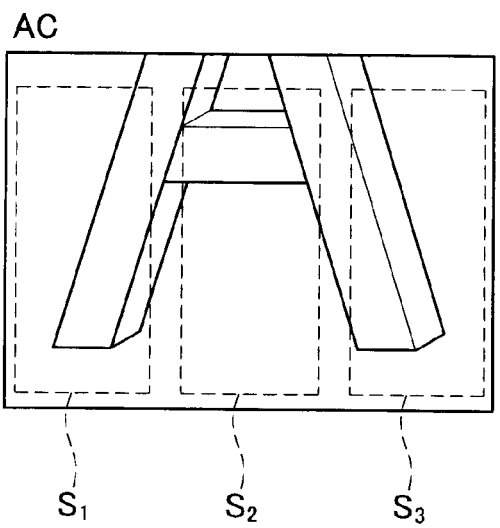
FIG. 11 shows another example of a plurality of corresponding areas S within a connected member side image

FIG. 11 shows an example of arm side image taken by the arm side camera that operates in accordance with the body trunk side cameras. In order to supplement information of the unknown areas $TC_1$, $TC_2$ and $TC_3$, process of steps S607 to S611 are carried out on the arm side image AC to specify the corresponding areas $S_1$, $S_2$ and $S_3$.

With the process of steps S613 to S617, the areas $R_1$, $R_2$ and $R_3$ of the respective body trunk side cameras $TC_1$, $TC_2$ and $TC_3$ are replaced with respective corresponding area $S_1$, $S_2$ and $S_3$ of the arm side image. As a result, a plurality of body trunk side images whose unknown areas has been supplemented can be obtained.

Furthermore, the robot 100 of the present embodiment may be provided with a plurality of arm side cameras. In such a case, it is preferable that a determination device that determines and selects for each of the area R of the body trunk side images an arm side image in which a corresponding area S that most widespreadly covers the area R is specified.

The robot 100 of the present embodiment may further calculate the relative position of the surrounding objects with respect to the robot 100 by using the composite image(s) obtained by the aforementioned procedures. The relative position of the surrounding objects with respect to the robot 100 may be recognized by converting the relative positional coordinates of the object in the world coordinate system into coordinates within a local coordinate system whose center is set at the location of the robot.

Second Embodiment

As for the configurations in common with the first embodiments, the same reference numericals are given and the explanation thereof may be omitted.

Figure 12:
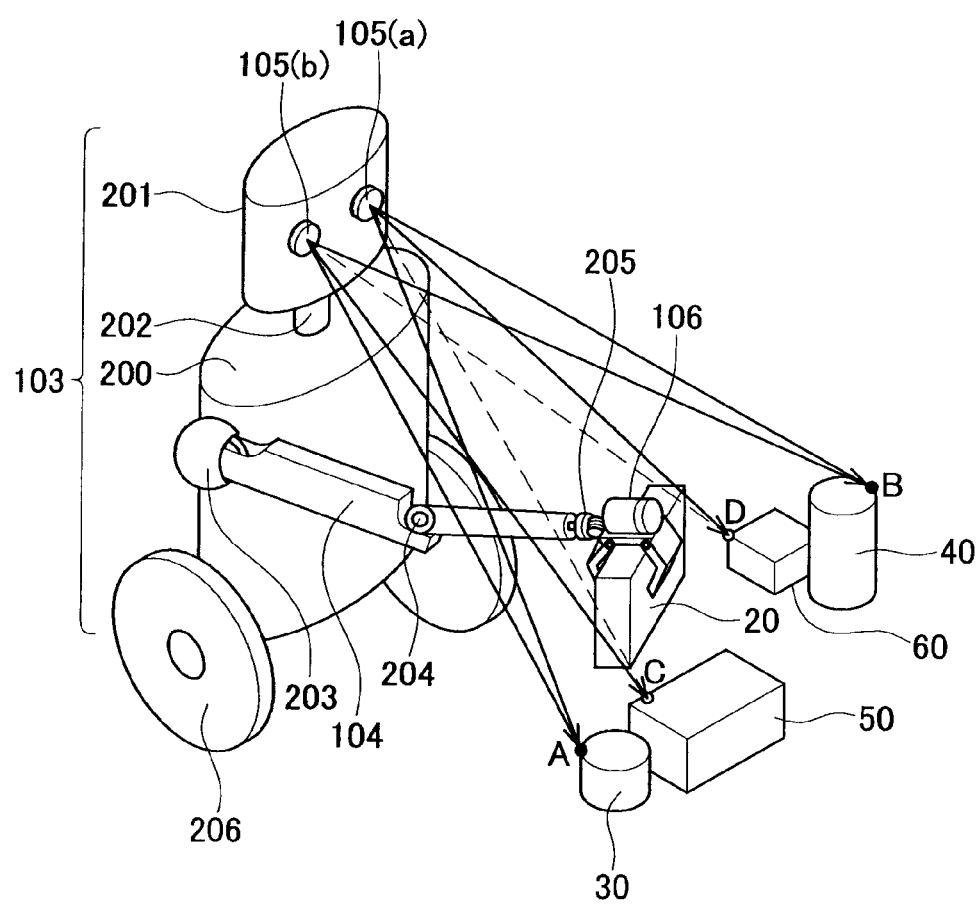
FIG. 12 shows a perspective view of a robot of the second embodiment and its surrounding environment.

FIG. 12 shows a perspective view of a stereo camera robot of this embodiment and its surrounding environment. The robot 100 of the present embodiment is provided with a body trunk 103, and a connected member (hereinafter referred to as "arm") 104 connected to the body trunk 103 by a shoulder joint 203. A plurality of arms 104 may be provided. The body trunk 103 includes a torso 200, a neck joint 202 and head 201. A pair of body trunk side cameras 105(a) and 105(b) are fixedly arranged on the head 201. The body trunk side cameras 105(a) and 105(b) change their photographing directions (hereinafter may be referred to simply as "directions" or "camera directions") with respect to the torso 200 by the rotation of the neck joint 202. A pair of coaxial wheels 206 is arranged on the lower side of the torso 200. The robot 100 moves the body trunk 103 by using the wheels 206.

The arm 104 includes a shoulder joint 203, elbow joint 204, and wrist joint 205. An arm side camera 106 is arranged on the hand part. The shoulder joint 203, elbow joint 204, and wrist joint 205 are each installed with a driving mechanism. Thus, the arm side camera 106 may change its camera direction with respect to the torso 200 by the driving force of the shoulder joint 203, elbow joint 204, and wrist joint 205. Furthermore, the position of the arm side camera 106 with respect to the torso 200 may also be changed by the works of those joints.

The robot is further provided with a device that measures the position of the head 201 within the working environment of the robot 100 so that the camera positions and the directions of the body trunk side cameras 105(a) and 105(b) are recognized. Moreover, with a relevant configuration, the camera position and the direction of the arm side camera 106 with respect to the body trunk 103 is also recognized.

The robot 100 of the present embodiment visually recognizes the surrounding objects 30, 40, 50 and 60, and plans a route in which it will not collide with those obstacles and operates to place the holding object 20 in an empty space. The body trunk side cameras 105(a) and 105(b) generally functions as a stereo camera. The points A, B, C and D in FIG. 12 indicates examples of focusing point of the robot's vision.

Figure 13:
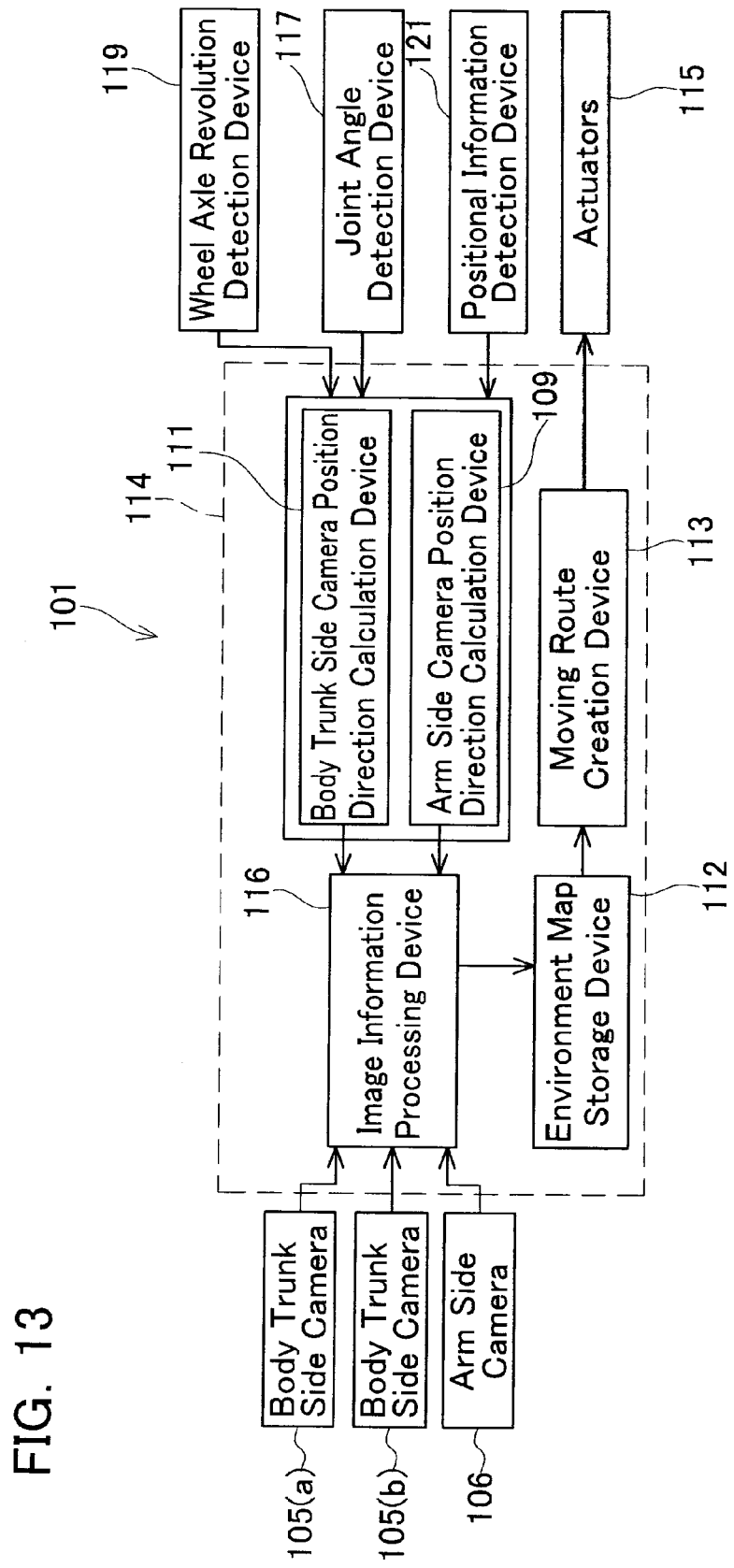
FIG. 13 shows a schematic mechanism of the robot of the second embodiment.

FIG. 13 shows a schematic mechanism 101 of the robot 100. The mechanism 101 is used in the robot's visual recognition of the surroundings. The robot 110 of the present embodiment is provided with a controller 114. The controller 114 includes an image information processing device 116, an environment map storage device 112, a moving route creation device 113, a body trunk side camera position/direction calculation device 111, and an arm side camera position/direction calculation device 109. The image information processing device 116 is configured to have body trunk side image information input from the body trunk side cameras 105(a) and 105(b), an arm side image information input from the arm side camera 106, positions and directions of the body trunk side cameras 105(a) and 105(b) input from the body trunk side camera position/direction calculation device 111, and a position and direction of the arm side camera 106 input from the arm side camera position/direction calculation device 109. Based on the aforementioned inputs, the image information processing device 116 creates an environment map and stores the created environment map in the environment map storage device 112. The moving route creation device 113 creates the further moving route based on the created environment map, and in accordance with the created moving route, controls the actuators 115 that are provided to drive the wheels 26 and the joints. Thus, the moving route creation device 113 controls the actuators 115 such that the wheels 26, the head 201 and arm 104 to move respectively in accordance with the created route. The robot 100 is further provided with a wheel axle revolution detection device 119 that detects the frequency of revolution of the wheels 26, a joint angle detection device 123 that detects the joint angle of each of the joints, and a positional information detection device 121 that is arranged in the torso 200 and detects the position of the torso 200. The information that are retrieved by the aforesaid devices are inputted into the body trunk side camera position/direction calculation device 111 and the arm side camera position/direction calculation device 109.

Since the robot comprises the moving route creation device 113 that creates the course to move by recognizing the surrounding environment from image information driven from cameras whose positions and photographing directions are known, the camera position and the camera directions may be calculated again after moving along the determined route, which may be followed by the process of taking pictures may be carried out again. The aforesaid series of processes may be repeated, which enables the robot to move autonomously.

Figure 14:
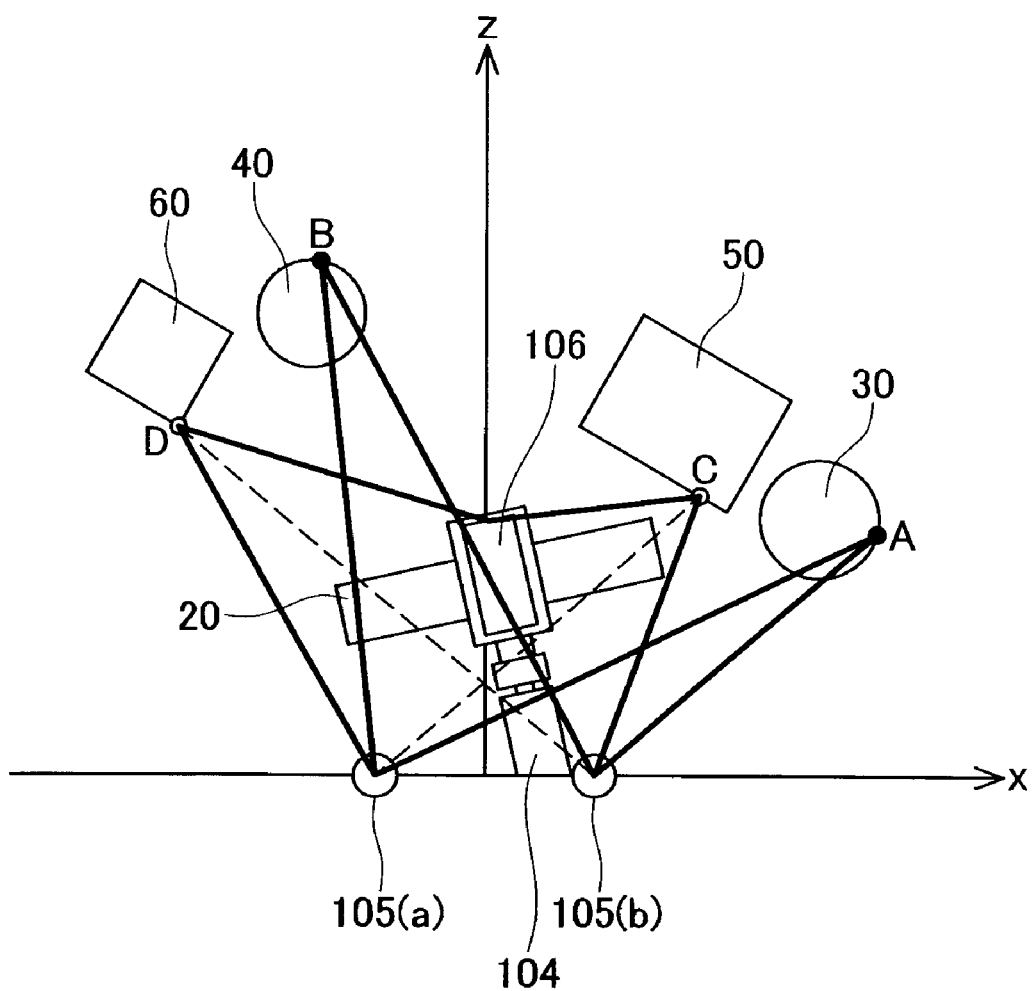
FIG. 14 shows a top plan view of the robot of the second embodiment

FIG. 14 shows a top plan view of the sight of the robot 100. As are shown, if the arm 104 of the robot 100 and its holding object 20 is in the sight of the body trunk side cameras 105(a) and 105(b), environmental information regarding the are behind the arm 104 and its holding object 20 cannot be obtained. Specifically, as shown in FIG. 14, the points A and B are visible to the body trunk side cameras 105(a) and 105(b) as shown with solid lines, thus stereo image may be created by using body trunk images taken by the body trunk side cameras 105(a) and 105(b). Moreover, information regarding those areas can be serially obtained in accordance with the progress of time.

On the other hand, as of the points C and D, a full vision thereof from both of the body trunk side cameras 105(a) and 105(b) cannot be established due to the operation of the arm or the hand part of the arm, thereby resulting in the stereovision of the points C and D not being possible with the body trunk side cameras 105(a) and 105(b). Information regarding those areas cannot be obtained. The broken lines indicate that an image including the feature point at focus cannot be photographed by both cameras due to the obstruction of the arm or its holding object.

In the case of stereovision, especially in a case where information regarding the lateral width (depth) or the height of surrounding objects are necessary, disparity information based on a plurality of images must be obtained. The plurality of images may be obtained either by taking pictures using a plurality of cameras whose positional information are known to the robot, or using a single camera and take pictures at different positions by moving the camera. Thus, due to the condition that the robot cannot make focus on either of the points C and D with both eyes (the body trunk side cameras), the positional relationship that lies in the areas of and around the points C and D cannot be recognized.

As in the case with points C and D where at least one of the body trunk side cameras 105(a) and 105(b) cannot function as stereo camera, a stereo image may be obtained by one of the body trunk side cameras 105(a) and 105(b) and the arm side camera 106.

In a case where nothing obstructs the view of the body trunk side cameras 105(a) and 105(b), as it is in the case of points A and B, the stereo image can be obtained by using the body trunk side cameras 105(a) and 105(b) and calculate the relative positional relationship of the surrounding object and the robot 100. This equals to the employment of a first calculating unit. On the other hand, in a case as it is in the case of points C, the stereo image can be obtained by using the body trunk side camera 105(b) and the arm side camera 106, while in a case as it is in the case of points D, the stereo image can be obtained by using one of the body trunk side camera 105(a) and the arm side camera 106. Information that is necessary to recognize the surrounding environment on the whole can be obtained by the aforementioned camera combinations, and the robot may calculate the relative positional relationship of the surrounding object and the robot 100. This equals to the employment of a second calculating unit.

In a case of using the arm side camera 106 as one of the stereo camera, the selection of the other camera from the body trunk side cameras 105(a) and 105(b) may be determined such that a body trunk side camera whose area in which the arm 104 to be photographed is the smallest is selected. The image information processing device 116 may execute the selection.

Figure 15:
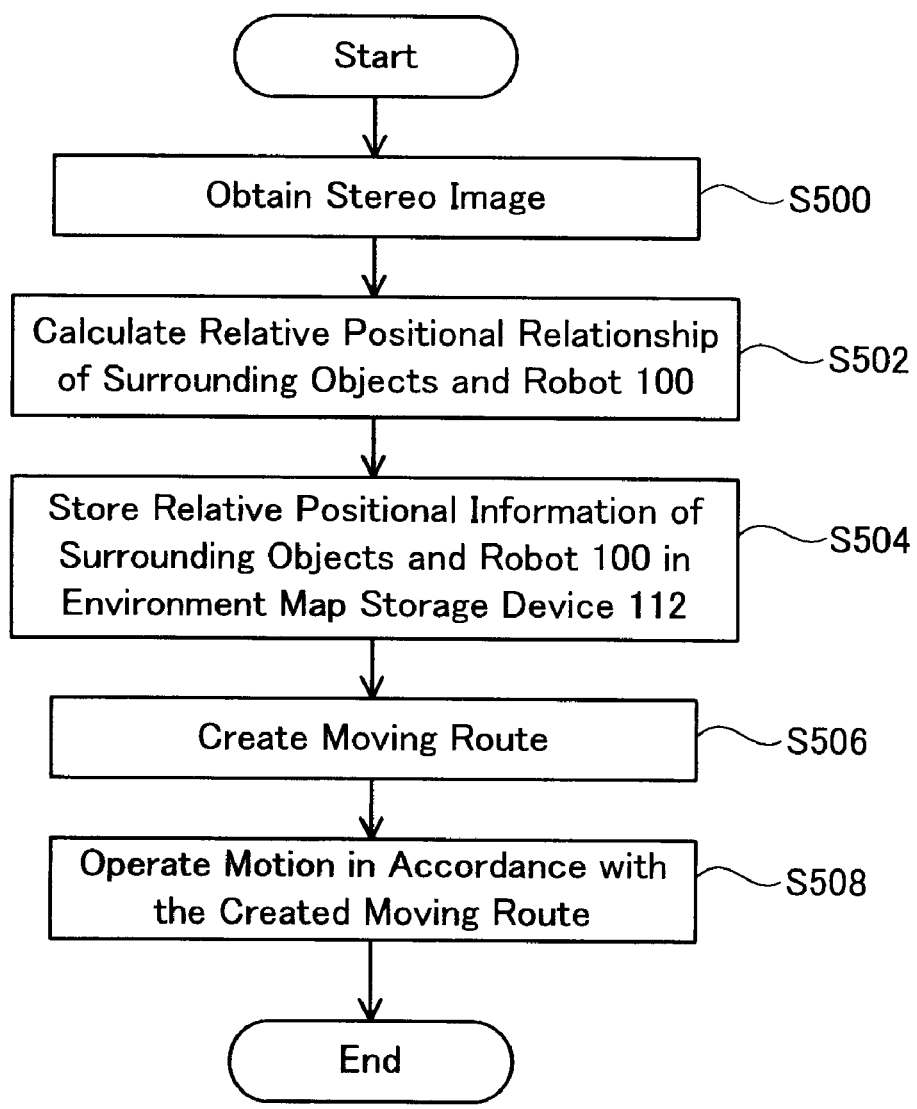
FIG. 15 is a flowchart showing a process of operation of the robot of the second embodiment.

FIG. 15 shows a flowchart of a process of operation of the robot of the present embodiment. The process below will be described in accordance with a case in which the robot 100 holds the object 20, and creates a route to place the holding object 20 in an empty space without colliding with the surrounding objects 30, 40, 50 and 60. The arm 104 of the robot 100 is located at a position as shown in FIG. 14, and the situation as shown in that figure is photographed by the body trunk side cameras 105(a) and 105(b) from where they are located. The image information processing as shown in FIG. 15 is commenced, for the arm 104 and the holding object 20 hide part of the objects 50 and 60 and thus the hidden part remains unknown to the robot.

In step S500, a stereo image is obtained from a plurality of images taken by the body trunk side cameras 105(a) and 105(b) and the arm side camera 106 that is input to the image information processing device 116. The image information processing device 116 may determine whether or not to use the arm side image in accordance with the size of the unknown areas within the body trunk side images. In such a case, the image information processing device 116 may comprise a mechanism that obtains stereo image from a combination of images in which the area that is obstructed by the arm 104 and become unknown is less photographed.

In step S502, based on the stereo image obtained in step S500, the relative positional relationship of the objects surrounding the robot 100 is calculated. The image data is converted from the world coordinate system to the local coordinate system in which the robot 100 is placed at the center. The positional relationship of the surrounding objects are calculated in accordance with the local coordinate system, and outputted as relative positional information of the robot 100 and its surrounding objects. In the process of acquiring the relative positional information, for example, disparity images or distance images may be utilized.

Furthermore, it is preferable that a first calculating device and a second calculating device are respectively provided for calculation in a case of obtaining stereo image from a combination of body trunk side images and for calculation in a case of obtaining stereo image from a combination of body trunk side image and arm side image. As for the combination of body trunk side images, the body trunk side cameras are parallel stereo. However, as for the combination of body trunk side image and arm side image, the relative positions of the cameras differ. Thus, the second calculating device may be configured to apply coordinate system converting process, such as rectification of stereo image, hand-eye calibration, or the like.

In step S504, the relative positional information calculated by the image information processing device 116 is constructed as data that express the relative positioning of the surrounding objects and stored in the environment map storage device 112. An environment map refers to data of which the robot 100 uses to recognize the relative positioning of the surrounding objects. For example, in a case of computing a disparity image with the image information processing device 116, the environment map may be expressed by a spatial disparity space (SDS). In the SDS, the surrounding objects 30, 40, 50 and 60 including the points A, B, C and D appear as curved surfaces having lateral or depthwise spatial expansion.

In step S506, a moving route of the robot 100 is created based on the environment map information. Since the robot 100 of the present embodiment aims to visually recognize the surrounding objects 30, 40, 50 and 60, create a moving route that will not collide with those obstacles, and place the holding object 20 in an empty space, it is preferable that the robot 100 extracts plane(s) in which the surrounding object does not exist based on such environmental information, and create route for the arm to place the holding object 20 within the extracted plane. In step S508, the actuators 115 operate the actual motion.

Figure 16:
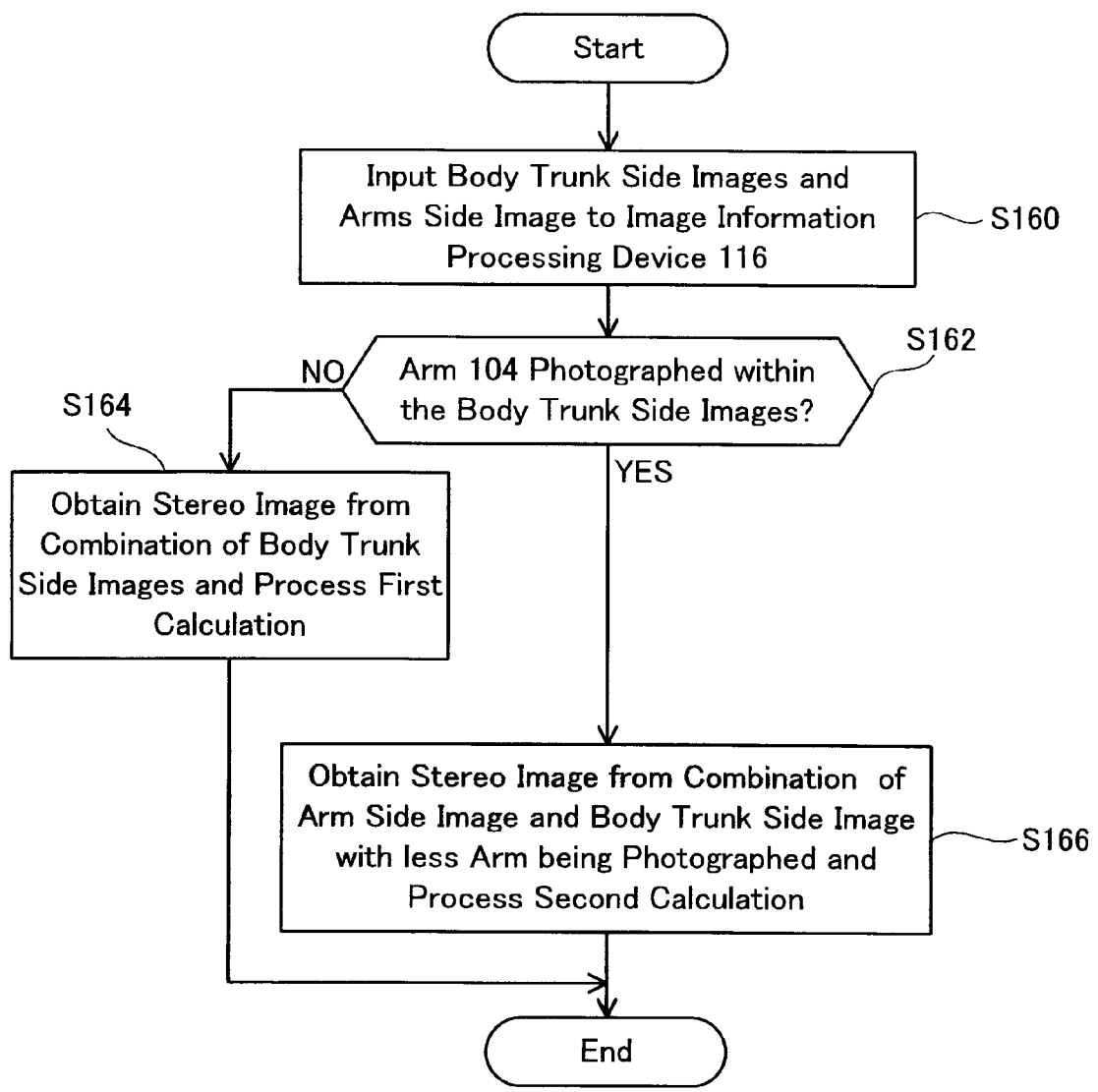
FIG. 16 is a flowchart showing an image processing for obtaining stereo image.

FIG. 16 is a flowchart showing an image processing for obtaining stereo image. As aforementioned, the stereo image in step S500 of FIG. 15 may be obtained basically by using a plurality of body trunk side images, or using one of the body trunk side images and an arm side image. In step S160, a plurality of body trunk side images taken by the body trunk side cameras 105(a) and 105(b) and an arm side image taken by the arm side camera 106 are input into the image information processing device 116. In step S162, it is determined whether or not the arm 104 is photographed within the body trunk side images. In a case where the arm 104 is not photographed in the body trunk side images ("NO" to step S162), the process proceeds to step S164. In step S164, a stereo image is obtained from a pair of body trunk side images, and the first calculation is processed. On the other hand, in a case where the arm 104 is photographed in the body trunk side images ("YES" to step S162), the process proceeds to step S166. In step S166, a stereo image is obtained from a pair of one of the body trunk side images and the arm side image, and the second calculation is processed. The body trunk side image that is selected in step S166 is the body trunk side image in which the area the arm 104 is photographed is the smallest.

In the present embodiment, an example of utilizing a total of three cameras arranged on the body trunk and the connected member to obtain a three-dimensional information of the surrounding objects has been indicated. However, the embodiment of the present invention is not limited to such configuration. It may utilize larger number of cameras, or may simply use a connected member side camera and obtain photographs in the series of moving the connected member side camera and changing the photographing angle or position.

Furthermore, the present embodiment has given an example of recognizing surrounding objects that are reposed to be still. However, with the aforementioned configuration, the robot may not be able to cope with a situation in which a new surrounding object has come to appear in the moving course of the robot after the robot is set in motion in accordance with the previously created moving route, or a situation in which the positions of the surrounding object and the robot have changed due to the motions carried out by the wheels or the connected member, and the moving route needs to be corrected.

Third Embodiment

Figure 17:
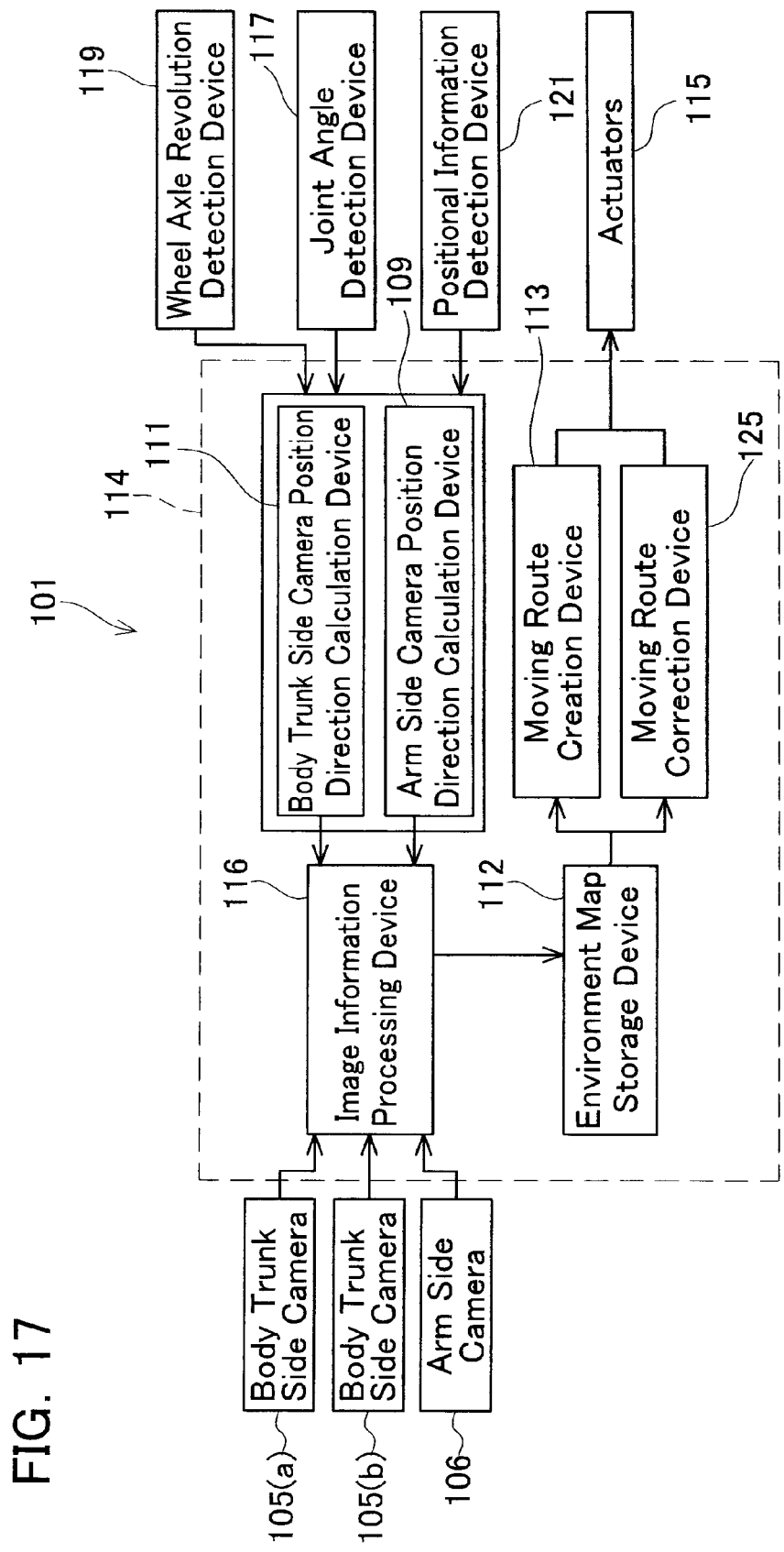
FIG. 17 shows a schematic mechanism of the robot of the third embodiment.

FIG. 17 shows a schematic mechanism 101 of the robot of the third embodiment that is configured to deal with surrounding objects in motion. The mechanism 101 of the robot is, in addition to the configuration of the mechanism of the robot of the second embodiment, further provided with a moving route correction device 125. The moving route correction device 125 makes correction to the created moving route of the connected member. Thus, the robot is able to dynamically correct its moving course which has already been put into process.

Furthermore, since the surrounding environmental data may dynamically be updated, the change in the surrounding environment and the motion of the arm may be serially recognized, and the moving course may be corrected in accordance with the change.

The specific embodiment of the present invention is described above, but these merely illustrate some embodiments of the invention and do not restrict the claims thereof. The art set forth in the claims includes various transformations and modifications to the specific embodiments as set forth above.

For example, aside from the arm side camera arranged on the arm, one or more connected member side camera(s) may be arranged at a plurality of connected members; the legs or the like. Or, a plurality of cameras may be rotatably arranged at different positions of the connected member. In either of the aforesaid examples, photographable scope may further be expanded.

The technical elements disclosed in the present specification or figures may be utilized separately or in all types of conjunctions and are not limited to the conjunctions set forth in the claims at the time of filing of the application. Furthermore, the art disclosed in the present specification or figures may be utilized to simultaneously realize a plurality of aims or to realize one of these aims.

The invention claimed is:

1. A moveable robot comprising:
    a body trunk;
    a connected member that is connected to the body trunk by a joint in which a driving mechanism is provided;
    a plurality of body trunk side cameras that are arranged on the body trunk;
    a connected member side camera that is arranged on the connected member; and
    a composite image creation unit that creates a composite image in which the connected member is excluded from a body trunk side image by replacing a part of the body trunk side image taken by the body trunk side camera with a part of a connected member side image taken by the connected member side camera;
    wherein the composite image creation unit creates the composite image for each body trunk side image taken by the respective body trunk side camera.

2. The movable robot as in claim 1, wherein the composite image creation unit comprises:
    a first specifying unit that specifies an area in which the connected member is photographed within the body trunk side image;
    a second specifying unit that specifies an area within the connected member side image that photographs the same area specified by the first specifying unit; and
    a unit that replaces the area of the body trunk side image specified by the first specifying unit with the connected member side image of the area specified by the second specifying unit.

3. The movable robot as in claim 1, further comprising a unit that calculates a relative positional relationship, with respect to the movable robot, of an object existing within a photographed scope by utilizing the composite image created by the composite image creation unit.

4. A movable robot comprising:
    a body trunk;
    a connected member that is connected to the body trunk by a joint in which a driving mechanism is provided;
    a body trunk side camera that is arranged on the body trunk;
    a connected member side camera that is arranged on the connected member;
    a composite image creation unit that creates a composite image in which the connected member is excluded from a body trunk side image by replacing a part of the body trunk side image taken by the body trunk side camera with a part of the connected member side image taken by the connected member side camera; and
    an adjusting unit that is configured to adjust direction of the connected member side camera in a case where the connected member is in a scope of photograph of the body trunk side camera, such that the connected member side camera is directed to turn to a direction in which the scope of the photograph of the body trunk side camera is taken by the connected member side camera.

5. The movable robot as in claim 4, further comprising a plurality of body trunk side cameras;
    wherein the composite image creation unit creates the composite image for each body trunk side image taken by the respective body trunk side camera.

6. The movable robot as in claim 4, wherein the composite image creation unit comprises:
    a first specifying unit that specifies an area in which the connected member is photographed within the body trunk side image;

a second specifying unit that specifies an area within the connected member side image that photographs the same area specified by the first specifying unit; and a replacing unit that replaces the area of the body trunk side image specified by the first specifying unit with the connected member side image of the area specified by the second specifying unit.

7. The movable robot as in claim 4, further comprising a calculating unit that calculates a relative positional relationship, with respect to the movable robot, of an object existing within a photographed scope by utilizing the composite image created by the composite image creation unit.

* * * * *